(12) United States Patent
Mikuni et al.

(10) Patent No.: US 12,454,173 B2
(45) Date of Patent: Oct. 28, 2025

(54) ELECTRIC VEHICLE COOLING SYSTEM

(71) Applicant: Mazda Motor Corporation, Hiroshima (JP)

(72) Inventors: Yusuke Mikuni, Aki-gun (JP); Takafumi Tanehira, Aki-gun (JP); Chinami Morishima, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 391 days.

(21) Appl. No.: 18/188,718

(22) Filed: Mar. 23, 2023

(65) Prior Publication Data
US 2023/0311638 A1    Oct. 5, 2023

(30) Foreign Application Priority Data
Apr. 1, 2022   (JP) ................................ 2022-061858

(51) Int. Cl.
*B60K 11/04*    (2006.01)
*H02K 9/193*    (2006.01)
*H02K 11/25*    (2016.01)
*H02K 11/33*    (2016.01)

(52) U.S. Cl.
CPC .............. *B60K 11/04* (2013.01); *H02K 9/193* (2013.01); *H02K 11/25* (2016.01); *H02K 11/33* (2016.01); *B60L 2210/10* (2013.01); *B60L 2210/40* (2013.01)

(58) Field of Classification Search
CPC ......... B60K 11/02; B60K 11/04; B60L 58/26; B60L 58/33
See application file for complete search history.

(56) References Cited

U.S. PATENT DOCUMENTS

| | | | | |
|---|---|---|---|---|
| 10,315,519 | B2 * | 6/2019 | Sakata | B60L 3/0061 |
| 10,315,529 | B2 * | 6/2019 | Araki | B60L 53/66 |
| 10,829,005 | B2 * | 11/2020 | Onozawa | B60L 3/0023 |
| 10,919,391 | B2 * | 2/2021 | Ogaki | B60K 11/04 |
| 11,186,165 | B2 * | 11/2021 | Takazawa | B60L 7/08 |
| 11,247,577 | B2 * | 2/2022 | Honjo | B60L 3/0023 |
| 11,292,363 | B2 * | 4/2022 | Shimauchi | B60L 58/26 |
| 11,440,491 | B2 * | 9/2022 | Sakabe | B60K 11/02 |
| 11,447,037 | B2 * | 9/2022 | Klose | H01M 10/486 |
| 11,518,273 | B2 * | 12/2022 | Tokozakura | H01M 10/625 |
| 11,590,855 | B2 * | 2/2023 | Wainwright | B60L 58/26 |

(Continued)

FOREIGN PATENT DOCUMENTS

JP    2021030810 A    3/2021

*Primary Examiner* — Jeffrey J Restifo
(74) *Attorney, Agent, or Firm* — Alleman Hall & Tuttle LLP

(57) ABSTRACT

A cooling system for an electric vehicle is provided, which includes a drive unit disposed in a front part of a vehicle, a charger disposed rearward of the drive unit, a coolant circuit connected to the drive unit and the charger and having a bypass route bypassing the charger, a pump, a heat exchanger, at least one temperature sensor, and a control device which controls circulation of the coolant to the coolant circuit based on the temperature of the drive unit. The control device sends the coolant to the bypass route, when the charger is not in operation, and when the temperature of the drive unit is below a given temperature, and sends the coolant to the drive unit after sending the coolant to the charger, when the charger is not in operation, and when the temperature of the drive unit is above the given temperature.

11 Claims, 12 Drawing Sheets

(56) References Cited

U.S. PATENT DOCUMENTS

| | | | |
|---|---|---|---|
| 11,858,370 B2* | 1/2024 | Matsuyama | B60L 50/60 |
| 11,942,612 B2* | 3/2024 | Fujikawa | B60L 53/00 |
| 12,030,406 B2* | 7/2024 | Lee | B60L 58/26 |
| 12,101,050 B2* | 9/2024 | Kondo | B60K 11/02 |
| 12,132,188 B2* | 10/2024 | Eser | H01M 10/66 |
| 12,179,573 B2* | 12/2024 | Eser | B60L 58/26 |
| 12,240,289 B2* | 3/2025 | Eser | B60H 1/00278 |
| 12,311,803 B2* | 5/2025 | Ogaki | H01M 10/613 |
| 2020/0290427 A1* | 9/2020 | Watanabe | H01M 10/613 |
| 2021/0053436 A1* | 2/2021 | Kiyomihara | B60K 11/02 |
| 2023/0130832 A1* | 4/2023 | Dunn | H02J 7/0048 |
| | | | 320/109 |
| 2023/0158908 A1* | 5/2023 | Hou | B60L 3/0046 |
| | | | 320/109 |
| 2023/0311638 A1* | 10/2023 | Mikuni | B60K 1/00 |
| | | | 180/68.4 |
| 2024/0066974 A1* | 2/2024 | Arai | H01M 10/6551 |
| 2024/0198763 A1* | 6/2024 | Ok | B60K 11/02 |
| 2024/0269593 A1* | 8/2024 | Junginger | H01M 10/635 |
| 2024/0300350 A1* | 9/2024 | Hashida | B60L 53/24 |
| 2024/0380280 A1* | 11/2024 | Zeyher | H01M 10/625 |
| 2024/0399929 A1* | 12/2024 | Barnes | B60L 1/003 |
| 2024/0413424 A1* | 12/2024 | Vuylsteke | H01M 10/635 |
| 2024/0424866 A1* | 12/2024 | Morishima | B60H 1/3205 |
| 2024/0424884 A1* | 12/2024 | Long | B60K 1/02 |
| 2024/0424893 A1* | 12/2024 | Long | B60K 11/02 |
| 2025/0010703 A1* | 1/2025 | Driant | H02P 29/62 |
| 2025/0035029 A1* | 1/2025 | Liu | H01M 10/613 |
| 2025/0042300 A1* | 2/2025 | Nagai | B60L 50/16 |

* cited by examiner

ELECTRIC VEHICLE COOLING SYSTEM

TECHNICAL FIELD

The present disclosure relates to a cooling system for an electric vehicle.

BACKGROUND OF THE DISCLOSURE

In cooling systems for electric vehicles, such as electric vehicles (EVs) and plug-in hybrid vehicles (PHVs), it is known that coolant which came out of a radiator is circulated in the order of: a DC-DC converter, an inverter, a charger, a converter, a generator, and a drive motor (for example, see JP2021-030810A).

Meanwhile, according to the technology disclosed in JP2021-030810A, the above-described electric devices other than the charger (i.e., the drive unit) are disposed inside a motor room in a front part of the vehicle, and the charger is disposed in a rear part of the vehicle.

Although it is necessary to cool the charger during operation, the necessity of cooling is low when not in operation. Therefore, when not in operation, the coolant circulation to the charger may be bypassed from the viewpoint of a reduction in the pump load. On the other hand, in a state where the coolant temperature tends to rise, for example, during a high torque, it becomes necessary to strengthen the cooling of the drive unit more than in the normal traveling situation. Therefore, from the viewpoint of achieving both the reduction in the pump load and the improvement in the cooling of the drive unit, there is room for an improvement in the conventional cooling system.

SUMMARY OF THE DISCLOSURE

Thus, one purpose of the present disclosure is to provide a cooling system for an electric vehicle capable of achieving both a reduction in a pump load and an improvement in cooling of a drive unit.

In order to achieve the above-described purpose, one aspect of a cooling system for an electric vehicle as disclosed herein includes a drive unit disposed in a front part of the vehicle, a charger disposed rearward of the drive unit, a coolant circuit connected to the drive unit and the charger and having a bypass route bypassing the charger, a pump provided in the coolant circuit and configured to send coolant to the coolant circuit, a heat exchanger provided in the coolant circuit and configured to cool the coolant, at least one temperature sensor provided to the drive unit and configured to detect temperature of the drive unit, and a control device configured to control circulation of the coolant to the coolant circuit based on the temperature of the drive unit detected by the at least one temperature sensor. The control device sends the coolant to the bypass route, when the charger is not in operation, and when the temperature of the drive unit is below a given temperature, and sends the coolant to the drive unit after sending the coolant to the charger, when the charger is not in operation, and when the temperature of the drive unit is above the given temperature.

Electric vehicles, such as electric vehicles (EVs) and plug-in hybrid vehicles (PHVs), are provided with a charger for converting a household alternate-current (AC) power supply into a direct-current (DC) voltage and charging a high-voltage battery which accumulates electric power for traveling. When the high-voltage battery is being charged with the charger (i.e., when the charger is in operation), it is necessary to cool the charger using the coolant in order to suppress an excessive increase in the temperature. However, for example, when the high-voltage battery is not being charged with the charger (i.e., when the charger is not in operation), such as when the vehicle is traveling, the necessity of cooling the charger is low, and therefore, it is effective to bypass the coolant circulation to the charger, from the viewpoint of a reduction in the pump load.

Meanwhile, the present inventors found that, since the charger is disposed rearward of the drive unit, the charger is also capable of serving as a second heat exchanger, so to speak, by making the coolant circulate to the charger also when not in operation.

That is, according to this configuration, by making a detour of the coolant circulation to the charger, when the temperature of the drive unit is below the given temperature, while the charger is not in operation, the load of the pump can be reduced. On the other hand, when the temperature of the drive unit is above the given temperature, while the charger is not in operation, the coolant is intentionally sent to the charger so that the charger functions as the second heat exchanger, and the cooling of the drive unit can be strengthened. In this way, according to this configuration, both the reduction in the pump load and the improvement in the cooling of the drive unit can be achieved.

The drive unit may include a plurality of electric devices. The at least one temperature sensor may be a plurality of temperature sensors, each provided to a respective one of the plurality of electric devices, and the control device may be configured to change a sending order of the coolant to the electric devices according to the temperatures of the electric devices.

According to this configuration, the highly-efficient cooling according to the priority of cooling the electric devices is possible.

The plurality of electric devices may include a DC-DC converter and an inverter. The control device may send the coolant first to the electric device with a higher temperature between the DC-DC converter and the inverter, when the temperature of at least one of the DC-DC converter and the inverter is above the given temperature.

According to this configuration, by sending the coolant first to the electric device with the higher temperature, either the DC-DC converter or the inverter, the cooling can be performed effectively for the electric device in greater need of cooling.

The charger may include a main body and a cooling fin provided to the main body.

According to this configuration, since the charger is provided with the cooling fin, the thermal resistance of the charger decreases and the heat release amount increases. Thus, the performance as the second heat exchanger of the charger can be improved.

The main body may be disposed inside the vehicle, and the cooling fin may project to the outside of the vehicle.

According to this configuration, since the cooling fin projects to the outside of the vehicle, the performance as the second heat exchanger of the charger can further be improved by heat exchange with external air.

The main body may be disposed inside a trunk floor of the vehicle. The cooling fin may extend downwardly from the main body, and project to the outside of the trunk floor.

According to this configuration, the heat release amount of the charger can be further increased by using the traveling wind. Thus, the performance as the second heat exchanger of the charger can effectively be improved.

The control device may send the coolant to the charger, when the charger is in operation.

According to this configuration, temperature can be suppressed from increasing excessively when the charger is in operation.

DETAILED DESCRIPTION OF THE DISCLOSURE

Hereinafter, one embodiment of the present disclosure is described in detail based on the accompanying drawings. Explanation of the following desirable embodiment is merely illustration essentially, and it is not intended to limit the present disclosure, its application, or its use.

Electric Vehicle

Figure 1:
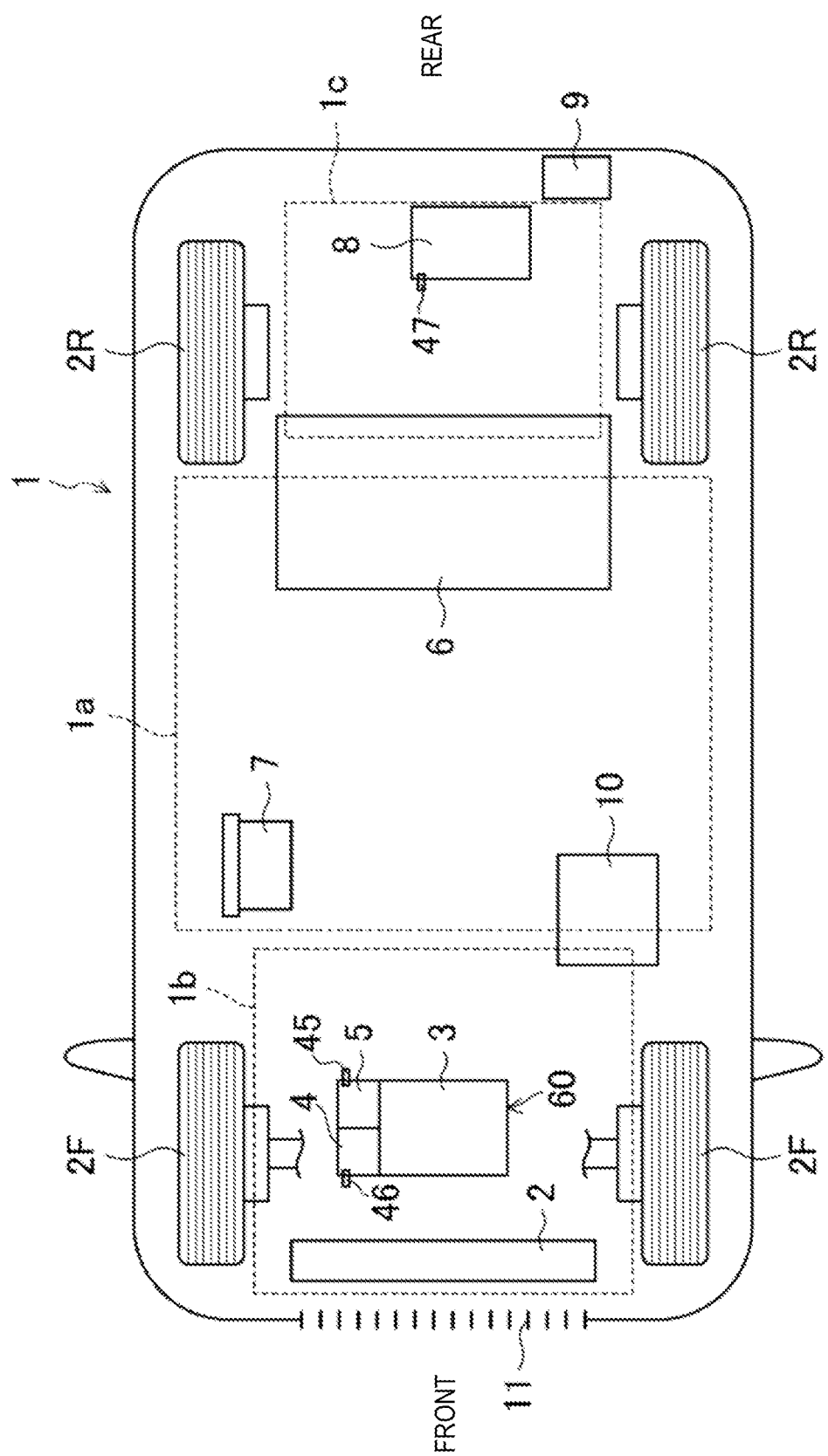
FIG. 1 is a schematic view illustrating a main configuration of a vehicle in one embodiment.

A vehicle 1 (electric vehicle) is illustrated in FIG. 1. In FIG. 1, a main configuration relevant to the disclosed art is displayed in a simplified manner.

Note that the direction is herein on the basis of the vehicle 1. That is, a longitudinal direction of the vehicle 1 is referred to as a front-and-rear direction, and the front of the vehicle 1 is referred to as the "front" and the rear part of the vehicle 1 is referred to as the "rear."

The vehicle 1 is a so-called "battery electric vehicle (BEV)". A pair of front wheels 2F, and a pair of rear wheels 2R are provided in the front and the rear part of the vehicle 1, respectively. The vehicle 1 travels by rotating the pair of front wheels 2F using electric power. A motor room 1b disposed in the front, a cabin 1a which is disposed at a center part and accommodates person(s) on board, and a trunk floor 1c disposed in the rear, are provided inside the vehicle 1.

As illustrated in FIG. 1, a radiator 2 (heat exchanger), a drive unit 60, a high-voltage battery 6, a low-voltage battery 7, a charger 8, a charge plug 9, a control device 10, etc. are mounted on the vehicle 1. The drive unit 60 is disposed inside the motor room 1b, and includes a drive motor 3, an inverter 4, and a converter 5, as a plurality of electric devices. Note that the radiator 2 and the control device 10 will be described later in the section of a cooling system 40.

Drive Motor

The drive motor 3 is an electric device which generates a driving force for the vehicle 1 to travel. A drive shaft of the drive motor 3 is connected with the pair of front wheels 2F via a transmission, a clutch, a drive shaft, etc., which are not illustrated. The drive motor 3 is a permanent-magnet synchronous motor in which the drive shaft rotates by three-phase alternating current.

High-Voltage Battery

The high-voltage battery 6 is a large-sized rechargeable battery which stores electric power for the vehicle to travel. The high-voltage battery 6 is disposed in a lower part of the vehicle 1, in a part from the cabin 1a to the trunk floor 1c. The high-voltage battery 6 is a high-voltage direct-current power source, and it is configured to accumulate electricity, for example, at a voltage of 300V or higher. The high-voltage battery 6 supplies the electric power for driving the drive motor 3.

Inverter

The inverter 4 is an electric device which performs an electric power control. The inverter 4 intervenes between the drive motor 3 and the high-voltage battery 6, and controls electric power supplied from the high-voltage battery 6 to the drive motor 3. Thus, the inverter 4 controls rotation of the drive motor 3.

An inverter circuit (not illustrated) including a plurality of switching elements, such as insulated-gate bipolar transistors (IGBTs) and capacitors, is provided inside the inverter 4. The inverter 4 generates the controlled three-phase alternating current using direct-current voltage supplied from the high-voltage battery 6 by carrying out an on-off control of the switching elements. By the alternating current being outputted to the drive motor 3, the drive motor 3 rotates with a required output.

Note that the inverter 4 is provided with an inverter temperature sensor 46 which detects the temperature of the inverter 4 and outputs a signal corresponding to the temperature.

Low Voltage Battery

The low-voltage battery 7 is a rechargeable battery with a rated voltage of 12V (or 24V), which is connected to a low-voltage power supply system. That is, the low-voltage power supply system is configured to supply 12V direct-current power.

The devices, such as the inverter 4, the converter 5, the control device 10, and an electric pump 41 (pump) (described later), including common electric equipment mounted on the vehicle 1, such as headlights and audio devices, are connected to the low-voltage power supply system. These devices operate by electric power source from this system.

Converter

The converter 5 is an electric device which converts direct-current power into direct-current power at different voltage (a so-called "DC-DC converter"). The converter 5 is connected to the high-voltage battery 6, and is also connected to the low-voltage power supply system including the low-voltage battery 7.

A voltage-lowering circuit (not illustrated) including a plurality of switching elements, such as IGBTs, capacitors, and coils, is provided inside the converter 5. By carrying out an on-off control of the switching elements, the converter 5 lowers the voltage of the high-voltage electric power of the high-voltage battery 6, and outputs it to the power supply system 15 of the low-voltage system.

That is, the converter 5 uses the electric power of the high-voltage battery 6 to charge the low-voltage battery 7 and directly supply the electric power to various electric devices mounted on the vehicle 1.

Note that the converter 5 is provided with a converter temperature sensor 45 which detects the temperature of the converter 5 and outputs a signal corresponding to the temperature.

Charge Route and Charger of High-Voltage Battery

In order to charge the high-voltage battery 6, the vehicle 1 is provided with the charge plug 9, the charger 8, etc. As illustrated in FIG. 1, the charge plug 9 is disposed in the rear part of the vehicle 1. The charger 8 is disposed in the rear part of the vehicle 1 (in detail, below the trunk floor 1c) so that it is located near the charge plug 9.

Although not illustrated, the vehicle 1 is provided with two charging routes, a quick charging route and a normal charging route. The charge using the quick charging route (quick charge) can charge more quickly than the charge using the normal charging route (normal charge). The charge plug 9 includes two kinds of plugs corresponding to the quick charging route and the normal charging route (i.e., a high-voltage plug and a low-voltage plug).

The quick charging route is a direct charging route using the high-voltage direct current supplied from an external power source at high voltage equivalent to or higher than the high-voltage battery 6 (i.e., a specific power source, such as a charge stand). The quick charging route is comprised of a high-voltage plug of the charge plug 9, and a cable which connects the high-voltage plug to the high-voltage battery 6. When a connector for the specific power source is connected to the high-voltage plug, the high-voltage battery 6 can be charged directly.

On the other hand, the normal charging route is an indirect charging route using the low-voltage alternating current supplied from an external power source at voltage lower than the high-voltage battery 6 (i.e., a normal commercial power source at 100V, 200V, etc.). The normal charging route is comprised of a low-voltage plug of the charge plug 9, the charger 8, and a cable which connects them to the high-voltage battery 6.

When a connector of the commercial power source is connected to the low-voltage plug, the high-voltage battery 6 can be charged indirectly. Note that in the normal charging route, the charger 8 converts the alternating current of the commercial power source into direct current, and increases the low voltage of the commercial power source. That is, a voltage-increase and conversion circuit including a plurality of switching elements, such as IGBTs, capacitors, and coils, is provided inside the charger 8. The charger 8 carries out an on-off control of the switching elements to convert the inputted alternating current into direct current, increases the voltage, and outputs it.

Figure 2:
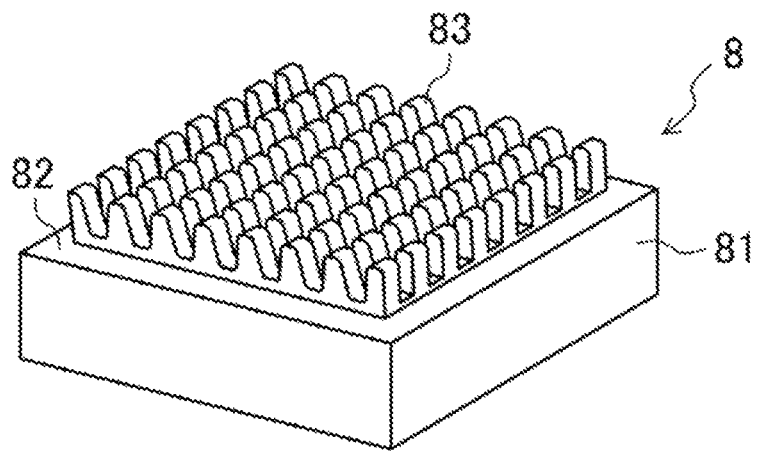
FIG. 2 is a perspective view illustrating one example of a charger.

FIG. 2 illustrates one example of the charger 8 of this embodiment. As illustrated in FIG. 2, the charger 8 includes a main body 81 and a cooling fin 83 provided in a bottom surface 82 of the main body 81.

Although it will be described later in detail, since the charger 8 is provided with the cooling fin 83, the thermal resistance of the charger 8 decreases and the heat release amount increases. Thus, the performance as a second radiator of the charger 8 in the cooling system 40 which will be described later can be improved.

Note that the cooling fin 83 is not limited as long as it is provided in an outer surface of the main body 81, and may be provided in the outer surface other than the bottom surface 82 in addition to or instead of the bottom surface 82.

Figure 3:
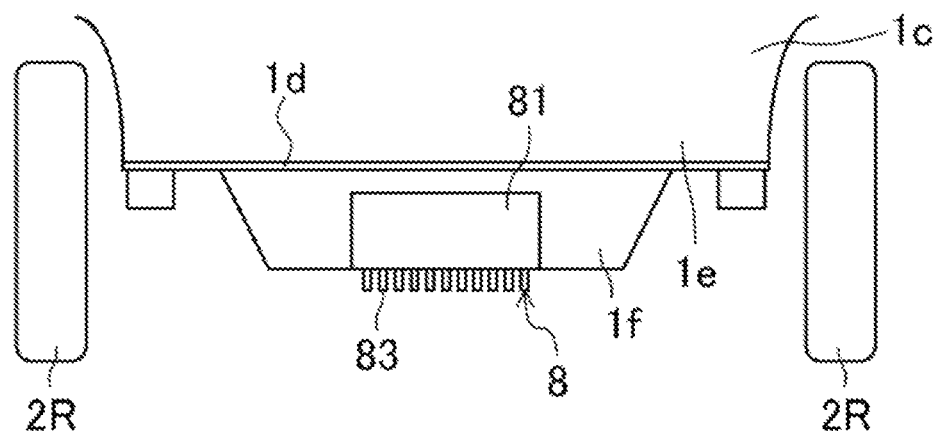
FIG. 3 is a view illustrating one example of an installation state of the charger in FIG. 2.

FIG. 3 illustrates one example of an installation state of the charger 8 in FIG. 2. As illustrated in FIG. 3, the trunk floor 1c of the vehicle 1 is partitioned by a trunk board 1d, and it includes a trunk room 1e above the trunk board 1d, and a pan if below the trunk board 1d. For example, the charger 8 can be disposed so that the main body 81 of the charger 8 is placed inside the pan if of the trunk floor 1c, and the cooling fin 83 extends downwardly from the main body 81 and projects to the outside of the trunk floor 1c.

Since the cooling fin 83 projects to the outside of the vehicle, the performance as the second radiator of the charger 8 can further be improved by heat exchange with external air. In particular, when the cooling fin 83 projects below the vehicle 1 from the pan if as illustrated in FIG. 3, since the traveling wind can be used, the performance as the second radiator of the charger 8 can effectively be improved.

Note that, as illustrated in FIG. 1, the charger 8 is provided with a charger temperature sensor 47 which detects the temperature of the charger 8 and outputs a signal corresponding to the temperature.

Cooling System

During operation of the drive motor 3, current flows into a coil disposed therein. Then, the drive motor 3 generates heat by the electrical resistance, etc. of the coil, and the internal temperature of the drive motor 3 increases. When the internal temperature increases excessively, the motor performance may be degraded and a failure may be caused. Therefore, the drive motor 3 needs to be cooled.

Further, since a so-called "switching control" is performed for the inverter 4, the converter 5, and the charger 8, during their operation, their electric circuits generate heat by the electrical resistance. When the temperature of the electric circuit becomes excessively high, it may damage the electric circuit. Therefore, each of the inverter 4, the converter 5, and the charger 8 needs to be cooled, especially, during operation.

Figure 4:
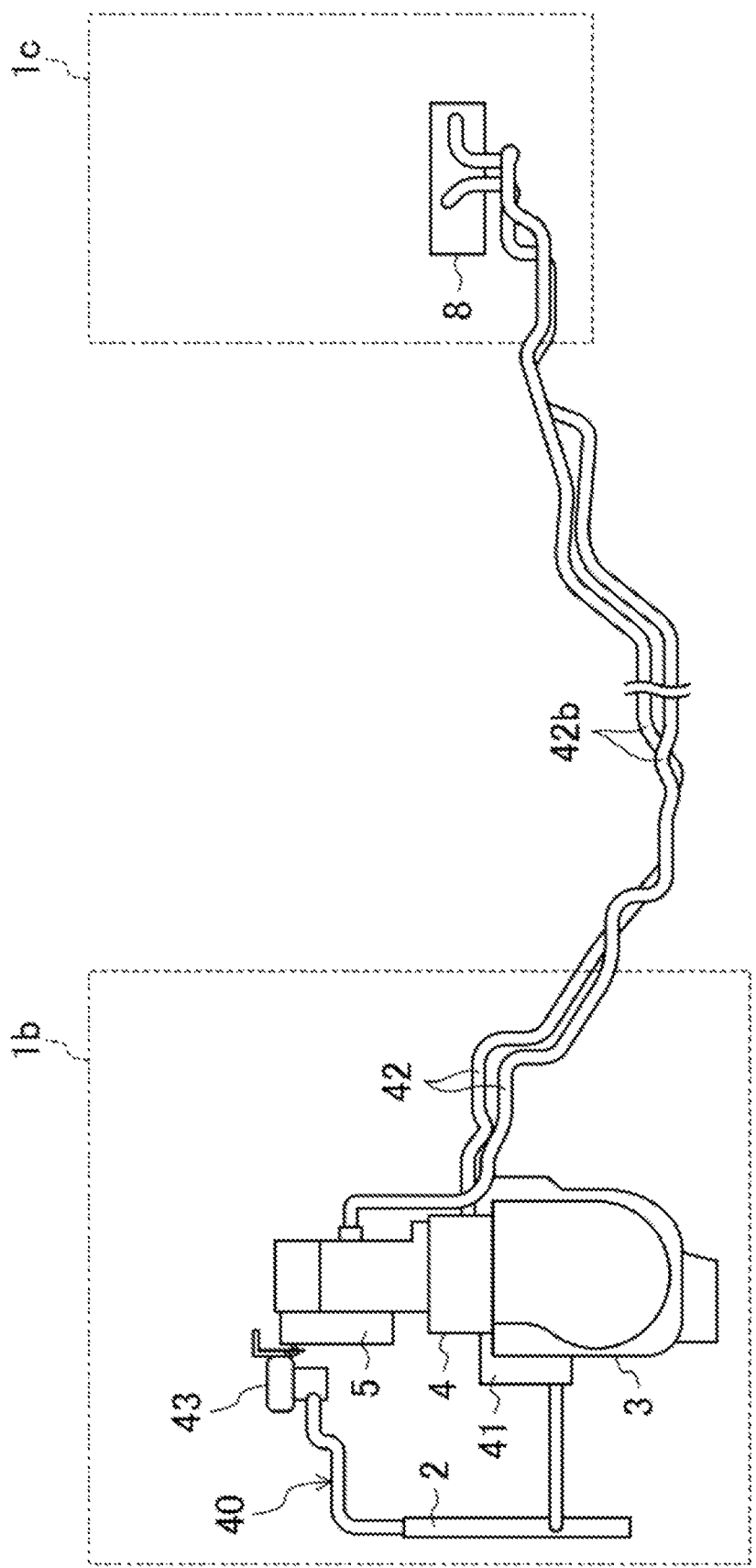
FIG. 4 is an outline side view of a cooling system.
Figure 5:
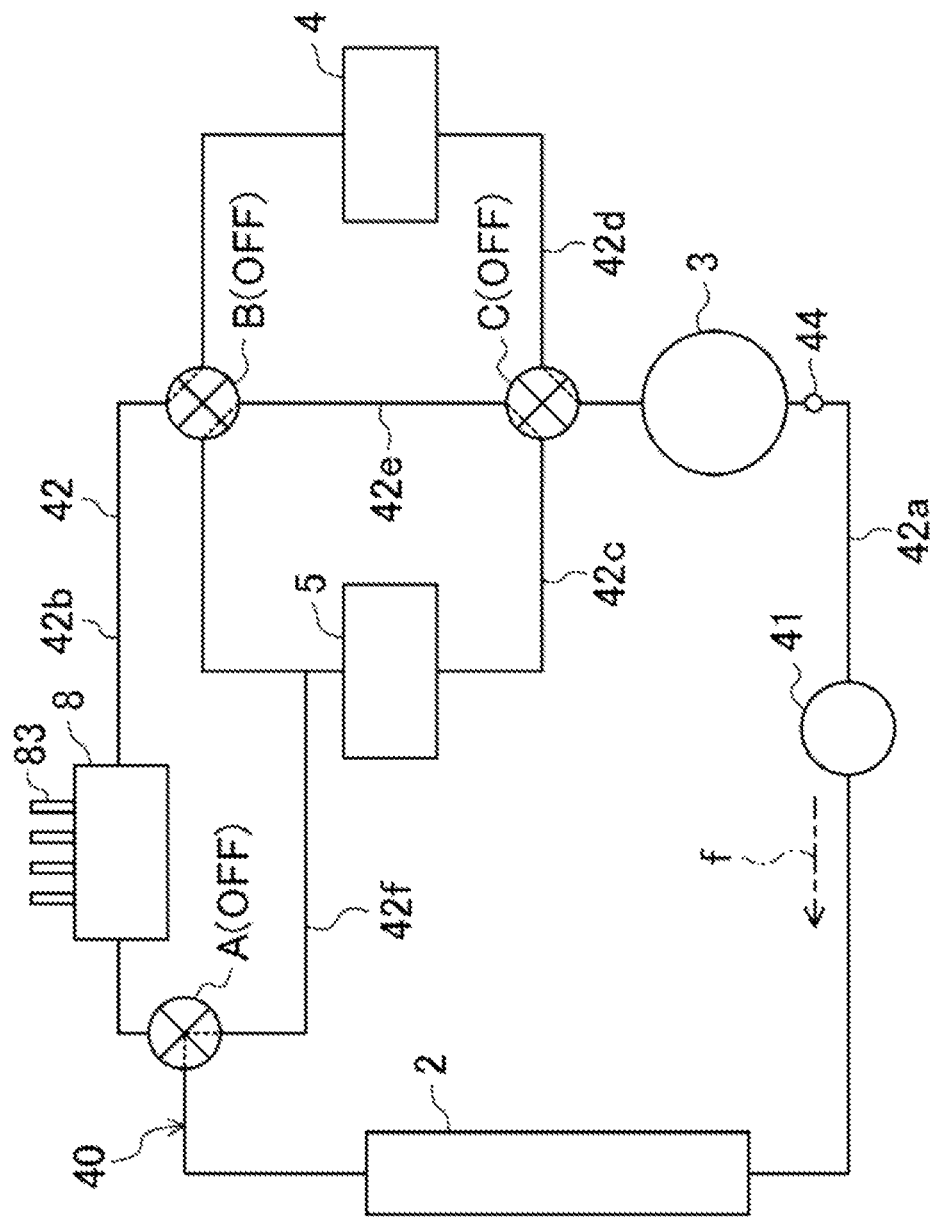
FIG. 5 is an outline block flow diagram of the cooling system.

As illustrated in FIGS. 4 and 5, in order to cool each of the electric devices which require cooling, a so-called "cooling system" (electric vehicle cooling system) 40 is installed in the vehicle 1.

The cooling system 40 is comprised of the radiator 2 (heat exchanger), the electric pump 41, a coolant circuit 42, and a deaeration tank 43 (see FIG. 4) for removing air contained in the coolant. Note that, in FIGS. 5, and 8 to 11 which will be described later, illustration of the deaeration tank 43 is omitted for simplification.

The cooling system 40 circulates and supplies the coolant cooled by the radiator 2 to each electric device to cool the electric device.

Note that, herein, in the cooling system 40, upstream in the coolant-sending direction of the coolant may be referred to as "upstream," and downstream in the coolant-sending direction of the coolant may be referred to as "downstream."

Radiator

As illustrated in FIGS. 4 and 5, the radiator 2 is a device which is provided to the coolant circuit 42 and cools the coolant.

As illustrated in FIG. 1, the radiator 2 is disposed in a front end part of the vehicle 1 so that it extends in the vehicle width direction. The radiator 2 opposes to a front grille 11 which covers a front end surface of the vehicle 1. When the vehicle 1 is traveling, external air flows into the motor room 1b through the front grille 11. When the vehicle 1 is stopped, external air flows into the motor room 1b through the front grille 11 by being forcibly driven by a fan (not illustrated). The radiator 2 cools the coolant by carrying out heat exchange with external air.

Electric Pump

The electric pump 41 is a device for sending the coolant into the coolant circuit 42, and although it is not intended to limit thereto, it is a non-positive displacement pump in detail. The electric pump 41 is connected with a part of the coolant circuit 42 upstream of the radiator 2 via piping. When the electric pump 41 operates, the coolant circulates through the coolant circuit 42 in a direction illustrated by an arrow f of a one-dot chain line in FIG. 5.

The electric pump 41 operates according to control of the control device 10. In the control device 10, a command value (for example, a duty ratio) of an output to the electric pump 41 used as a reference is set beforehand according to the cooling system 40. The electric pump 41 is controlled to operate with the output used as the reference, when the cooling system 40 is used (a so-called "on-off control").

Coolant

The coolant used for the cooling system 40 is not limited in particular, and it may adopt a known coolant commonly used for automobile cooling systems. In detail, for example, the coolant may adopt a so-called "antifreeze solution" which includes water and ethylene glycol, and does not freeze even below 0° C. (e.g., −30° C.). The antifreeze solution has a viscosity higher than water, and the viscosity increases as the temperature decreases.

Coolant Circuit

As illustrated in FIG. 4, the coolant circuit 42 is comprised of piping which is connected to the drive unit 60 and the charger 8 and through which the coolant flows.

As illustrated in FIG. 5, the coolant circuit 42 includes a first route 42a, a second route 42b, a third route 42c, a fourth route 42d, a fifth route 42e, a sixth route 42f (bypass route), and selector valves A, B, and C which change between the routes.

Note that FIG. 5 illustrates a state where the operation of the vehicle 1 is stopped and the high-voltage battery 6 is not currently charged (i.e., a non-used state of the cooling system 40). That is, the electric pump 41 is not in operation, and the selector valves A, B, and C are all in the OFF state.

On the first route 42a, the drive motor 3, the electric pump 41, and the radiator 2 are disposed. The coolant which passed the drive motor 3 is configured to send the coolant to the radiator 2 via the electric pump 41.

A downstream part of the first route 42a branches for the second route 42b and the sixth route 42f, and the selector valve A is provided at the branch point. The selector valve A selects either one of the second route 42b and the sixth route 42f as a route connected to a downstream end of the first route 42a. In detail, when the selector valve A is in the ON state, the coolant is sent to the second route 42b, and is not sent to the sixth route 42f (see FIGS. 8, 10, and 11). On the other hand, when the selector valve A is in the OFF state, the coolant is sent to the sixth route 42f, and is not sent to the second route 42b (see FIG. 9).

The charger 8 is disposed in the second route 42b. As described above, the radiator 2 and the drive unit 60 are disposed in the front part of the vehicle 1. Contrarily, the charger 8 is disposed rearward of the drive unit 60 (i.e., in the rear part of the vehicle 1). Therefore, as illustrated in FIG. 4, the second route 42b is comprised of a pair of piping which extend in the front-and-rear direction below the cabin 1a of the vehicle 1.

A downstream part of the second route 42b branches into the third route 42c and the fourth route 42d, and the selector valve B is provided at the branch point. The selector valve B selects either one of the third route 42c and the fourth route 42d as a route connected to a downstream end of the second route 42b. In detail, when the selector valve B is in the ON state, the coolant is sent to the third route 42c (see FIGS. 8 and 10). On the other hand, when the selector valve B is in the OFF state, the coolant is sent to the fourth route 42d (see FIG. 11).

The converter 5 and the inverter 4 are disposed in the third route 42c and the fourth route 42d, respectively. That is, when the selector valve B is in the ON state, the coolant which passed through the charger 8 is sent to the converter 5. When the selector valve B is in the OFF state, the coolant which passed through the charger 8 is sent to the inverter 4.

Note that although the fifth route 42e is also connected to the branch point where the selector valve B is provided, the coolant will not be directly sent from the second route 42b to the fifth route 42e. When the selector valve B is in the ON state, the fourth route 42d is connected to the fifth route 42e. When the selector valve B is in the OFF state, the third route 42c is connected to the fifth route 42e.

Downstream parts of the third route 42c and the fourth route 42d are connected to an upstream end of the first route 42a, and the selector valve C is provided at the junction. Because of the selector valve C, either one of the third route 42c and the fourth route 42d becomes a route connected to the upstream end of the first route 42a. In detail, when the selector valve C is in the ON state, a route through which the coolant flows from the third route 42c to the first route 42a is formed (see FIGS. 8 and 11). On the other hand, when the selector valve C is in the OFF state, a route through which the coolant flows from the fourth route 42d to the first route 42a is formed (see FIGS. 9 and 10).

Although the fifth route 42e is also connected to the junction where the selector valve C is provided, the coolant will not directly be sent from the fifth route 42e to the first route 42a. When the selector valve C is in the ON state, the fourth route 42d is connected to the fifth route 42e. When the selector valve C is in the OFF state, the third route 42c is connected to the fifth route 42e.

As will be described later in detail, when the selector valves A, B, and C are ON, ON, and OFF, respectively, the second route 42b, the third route 42c, the fifth route 42e, the fourth route 42d, and the first route 42a are connected in this order (a third state D3 which will be described later; see FIG. 10). This route connects the charger 8, the converter 5, the inverter 4, and the drive motor 3 in series in this order. In this route, the coolant passes through the charger 8, the converter 5, and the inverter 4 in this order, and is then sent to the drive motor 3.

Further, when the selector valves A, B, and C are ON, OFF, and ON, respectively, the second route 42b, the fourth route 42d, the fifth route 42e, the third route 42c, and the first route 42a are connected in this order (a fourth state D4 which will be described later; see FIG. 11). This route connects the charger 8, the inverter 4, the converter 5, and the drive motor 3 in series in this order. In this route, the coolant passes through the charger 8, the inverter 4, and the converter 5 in this order, and is then sent to the drive motor 3.

Thus, in the cooling system 40 according to this embodiment, the coolant sending order of the inverter 4 and the converter 5 is changeable by changing the selector valves A, B, and C.

The sixth route 42f is a route which bypasses the charger 8, and its downstream part is connected to an intermediate part of the third route 42c. Although not illustrated, the sixth route 42f may be piping which is disposed inside the motor room 1b.

Note that the above-described correspondences between the ON/OFF state of the selector valves A, B, and C and the routes (for example, the correspondence between the ON state of the selector valve A and the connected state of the first route 42a to the second route 42b) are illustrated conveniently, and the correspondences are not limited to those illustrated.

Note that the coolant circuit 42 is provided with a coolant temperature sensor 44 which detects a temperature of the coolant. The coolant temperature sensor 44 is disposed, for example, downstream of the drive motor 3 where the temperature of the circulating coolant becomes the highest.

Control Device

As illustrated in FIG. 1, the control device 10 is mounted on the vehicle 1. The control device 10 is comprised of hardware, such as a processor (e.g., a central processing unit (CPU)), RAM and ROM, and software, such as a control program implemented in the hardware. The control device 10 comprehensively controls the traveling of the vehicle 1.

Figure 6:
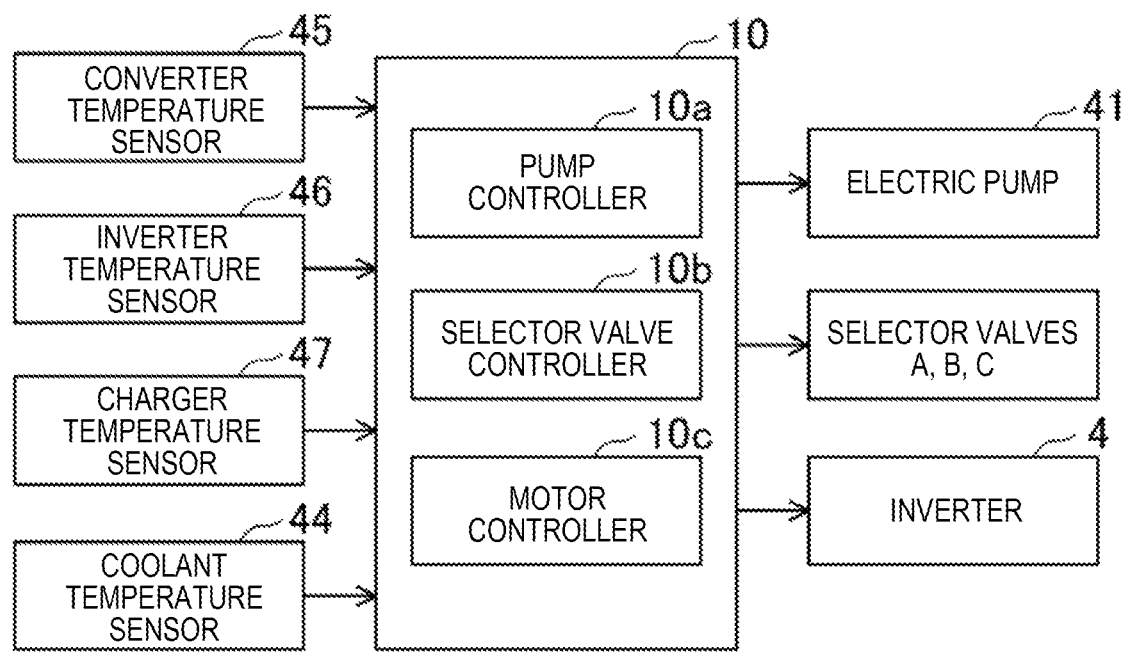
FIG. 6 is a block diagram illustrating a relationship between a control device and its main related apparatuses.

As illustrated in FIG. 6, the control device 10 is functionally provided with a pump controller 10a which controls the electric pump 41, a selector valve controller 10b which controls the selector valves A, B, and C, and a motor controller 10c which controls the operation of the drive motor 3 by using the inverter 4. Signals are inputted into the control device 10 from various sensors, such as the converter temperature sensor 45, the inverter temperature sensor 46, the charger temperature sensor 47, and the coolant temperature sensor 44, which are described above. Note that these temperature sensors may detect temperature indirectly from electric current, etc.

The motor controller 10c of the control device 10 controls the inverter 4 based on the signal inputted from the converter temperature sensor 45, etc. For example, the control device 10 determines the abnormality in the temperature of the converter 5 based on the signal inputted from the converter temperature sensor 45. As a result, when the control device 10 determines that the temperature is abnormal, the control device 10 performs a control to limit the output of the drive motor 3.

The pump controller 10a and the selector valve controller 10b of the control device 10 control the electric pump 41 and the selector valves A, B, and C, etc. to control the circulation of the coolant to the coolant circuit 42 based on the signals inputted from the converter temperature sensor 45, the inverter temperature sensor 46, the charger temperature sensor 47, and the coolant temperature sensor 44. That is, the control device 10 suitably operates the cooling system 40 so that the electric devices, such as the inverter 4, the converter 5, the drive motor 3, and the charger 8, which are the cooling targets, do not become abnormal in the temperature.

Method of Controlling Cooling System

When the operation of the vehicle 1 is stopped or shut down, at least the drive motor 3 and the inverter 4 do not operate. The charge to the high-voltage battery 6 is performed during the shutdown of the vehicle 1. When charging the high-voltage battery 6 using the commercial power source, the charger 8 operates. The converter 5 may operate according to the electric power state of the low-voltage power supply system 15 during the shutdown.

On the other hand, when the vehicle 1 operates, the drive motor 3 and the inverter 4 operate. The converter 5 operates according to the electric power state of the low-voltage power supply system 15, when the capacity of the low-voltage battery 7 decreases. The charger 8 does not operate when the vehicle 1 is operating.

That is, in the vehicle 1, since the electric devices operate both during the shutdown and during the operation, the cooling system 40 is also used in connection therewith. In detail, when the vehicle 1 operates, since the drive motor 3, the inverter 4, and the converter 5 operate to generate heat, the electric pump 41 operates in order to cool these devices. On the other hand, during the shutdown of the vehicle 1, since the charger 8 and the converter 5 operate according to the situation to generate heat, the electric pump 41 operates in order to cool these devices.

Figure 7:
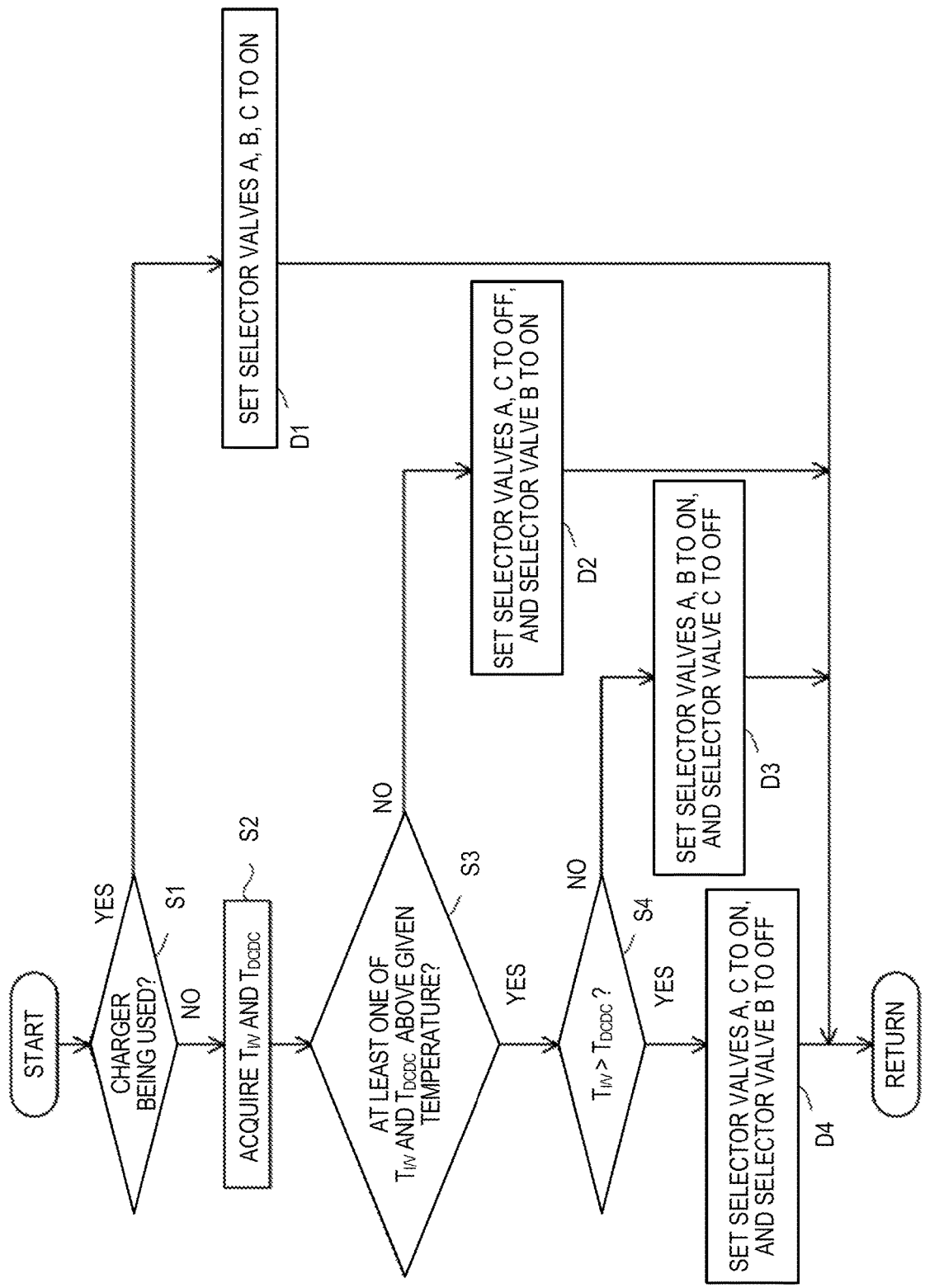
FIG. 7 is a flowchart illustrating one example of a method of controlling the cooling system.

FIG. 7 illustrates one example of a control flow of the cooling system 40.

First, it is determined whether the charger 8 is in a condition where it is being used (Step S1).

Figure 8:
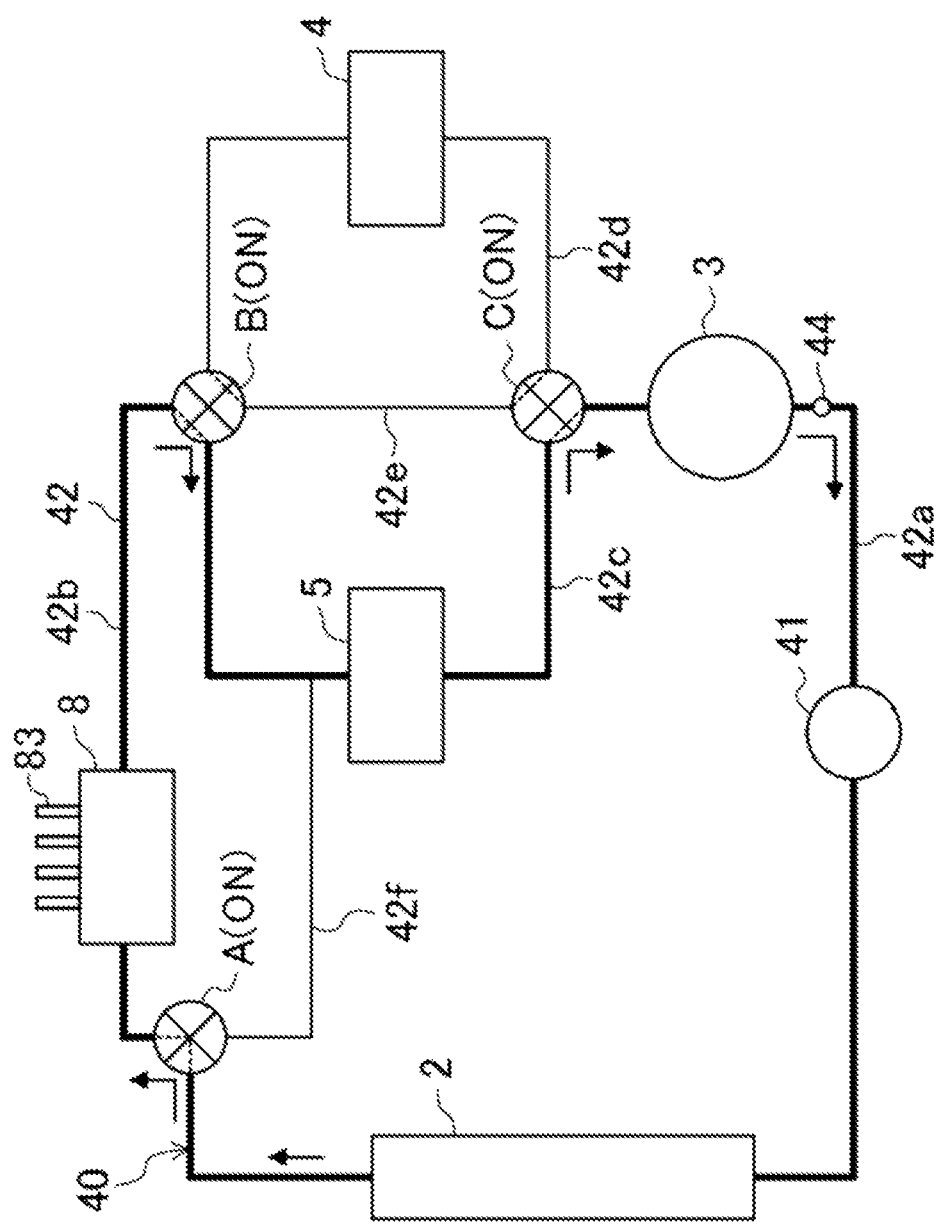
FIG. 8 is a view corresponding to FIG. 5, illustrating a first state.

If the charger 8 is being used (i.e., if the vehicle 1 is during the shutdown, and the high-voltage battery 6 is being charged with the normal charging route), the selector valves A, B, and C are set to the ON state (a first state D1) so that the coolant flows into the second route 42b, as illustrated in FIGS. 7 and 8. Thus, the coolant is sent to and cools the charger 8 so that it suppresses an excessive rise in the temperature of the charger 8. Note that the coolant which passed through the charger 8 is sent to the converter 5 by setting the selector valves B and C to the ON state. Thus, the converter 5 can also be cooled.

In this case, although the drive motor 3 is not in the operating condition, since the drive motor 3 has the largest calorific value among the electric devices included in the drive unit 60, it is configured so that the coolant is always sent during the operation of the cooling system 40. Although the coolant circuit 42 may be configured so that the coolant bypasses the drive motor 3 when the drive motor 3 is not in operation, the configuration of this embodiment is preferred in terms of reducing branches of the coolant circuit 42.

As illustrated in FIG. 7, when the charger 8 is not being used, a temperature $T_{I/V}$ of the inverter 4 and a temperature $T_{DCDC}$ of the converter 5 are acquired at Step S2.

Then, at Step S3, it is determined whether at least one of the temperature $T_{I/V}$ of the inverter 4 and the temperature $T_{DCDC}$ of the converter 5 is above a given temperature.

Figure 9:
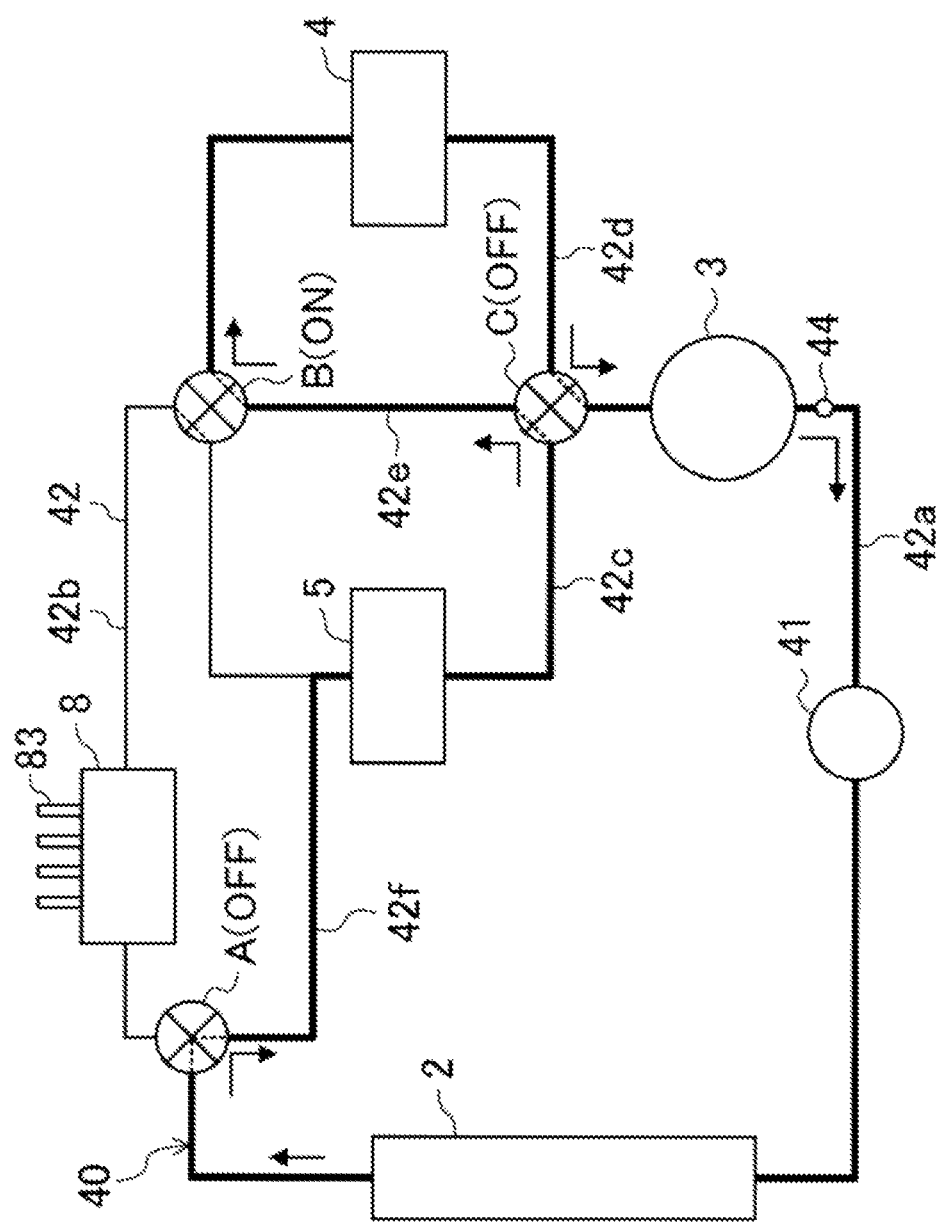
FIG. 9 is a view corresponding to FIG. 5, illustrating a second state.

For example, when the vehicle is in the normal traveling state, or when the operation of the vehicle is stopped or shut down, and the high-voltage battery 6 is being charged using the quick charging route, both the temperature $T_{I/V}$ of the inverter 4 and the temperature $T_{DCDC}$ of the converter 5 become below given temperature. In this case, as illustrated in FIGS. 7 and 9, the selector valves A and C are set to the OFF state and the selector valve B to the ON state (a second state D2). Thus, the coolant is sent to the sixth route 42f, and the coolant is prevented from flowing into the second route 42b. Therefore, the path length of the coolant circuit 42 can be shortened to reduce the load of the electric pump 41.

Note that the sixth route 42f is connected to a part of the coolant circuit 42 upstream of the converter 5 so that the coolant sent to the sixth route 42f is sent to the converter 5. Thus, the coolant is sent to the inverter 4 through the selector valves C and B, and is further sent to the drive motor 3 through the selector valve C. For example, during the normal traveling, the calorific value which may be generated in these electric devices is the smallest in the converter 5, and the inverter 4 and the drive motor 3 have larger calorific values in this order. As a principle, since each electric device can be efficiently cooled by disposing the electric devices with smaller calorific values at the upstream side in the coolant circuit 42, the coolant is desirable to be sent in this order. Note that since a difference in the calorific value between the converter 5 and the inverter 4 during the normal traveling is not large, the coolant sending order may be reversed.

As illustrated in FIG. 7, at Step S3, if at least one of the temperature $T_{I/V}$ of the inverter 4 and the temperature $T_{DCDC}$ of the converter 5 is determined to be above the given temperature, it transits to Step S4. Then, it is determined whether the temperature $T_{I/V}$ of the inverter 4 is higher than the temperature $T_{DCDC}$ of the converter 5.

For example, when the consumption of the low-voltage power supply system increases, and the electric power of the high-voltage battery 6 is used after that voltage is converted, the calorific value of the converter 5 increases. Then, the temperature $T_{DCDC}$ of the converter 5 becomes above the temperature $T_{I/V}$ of the inverter 4 (in other words, the temperature $T_{I/V}$ of the inverter 4 becomes below the temperature $T_{DCDC}$ of the converter 5). Then, it becomes necessary to strengthen the cooling of the converter 5.

Figure 10:
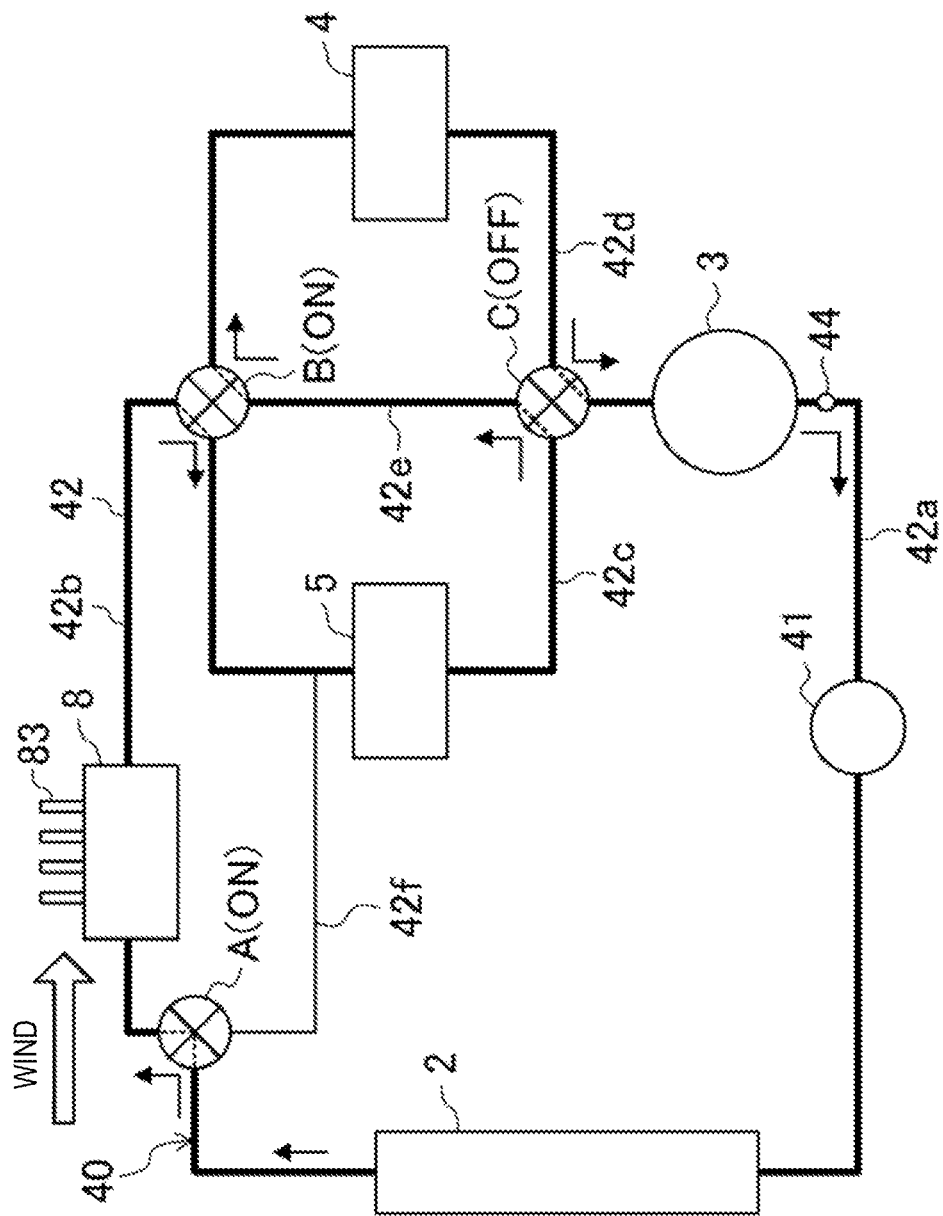
FIG. 10 is a view corresponding to FIG. 5, illustrating a third state.

In this case, in this embodiment, as illustrated in FIGS. 7 and 10, the selector valves A and B are set to the ON state, and the selector valve C to the OFF state (the third state D3). Therefore, the coolant is sent through the selector valve A to the second route 42b (i.e., to the charger 8). Then, after the coolant is sent to the converter 5 through the selector valve B, and sent to the inverter 4 through the selector valves C and B, the coolant is sent to the drive motor 3 again through the selector valve C.

Here, the present inventors found that, since the charger 8 is disposed rearward of the drive unit 20, the charger 8 is also capable of serving, so to speak, as a second radiator, by making the coolant circulate to the charger 8, also when not charging.

That is, this configuration can strengthen the cooling of the converter 5 by sending the coolant to the converter 5 after sending to the charger 8.

Note that according to this configuration, the cooling fin 83 which projects downward and outward of the vehicle 1 is provided to the charger 8. Therefore, it can further reduce the temperature of the coolant by using the traveling wind of the vehicle 1 to contribute to the cooling of the converter 5.

Next, for example, when the torque is high or when regeneration takes place for a long period of time, the calorific value of the inverter 4 increases. Then, the temperature $T_{I/V}$ of the inverter 4 becomes higher than the temperature $T_{DCDC}$ of the converter 5. Then, it becomes necessary to strengthen the cooling of the inverter 4.

Figure 11:
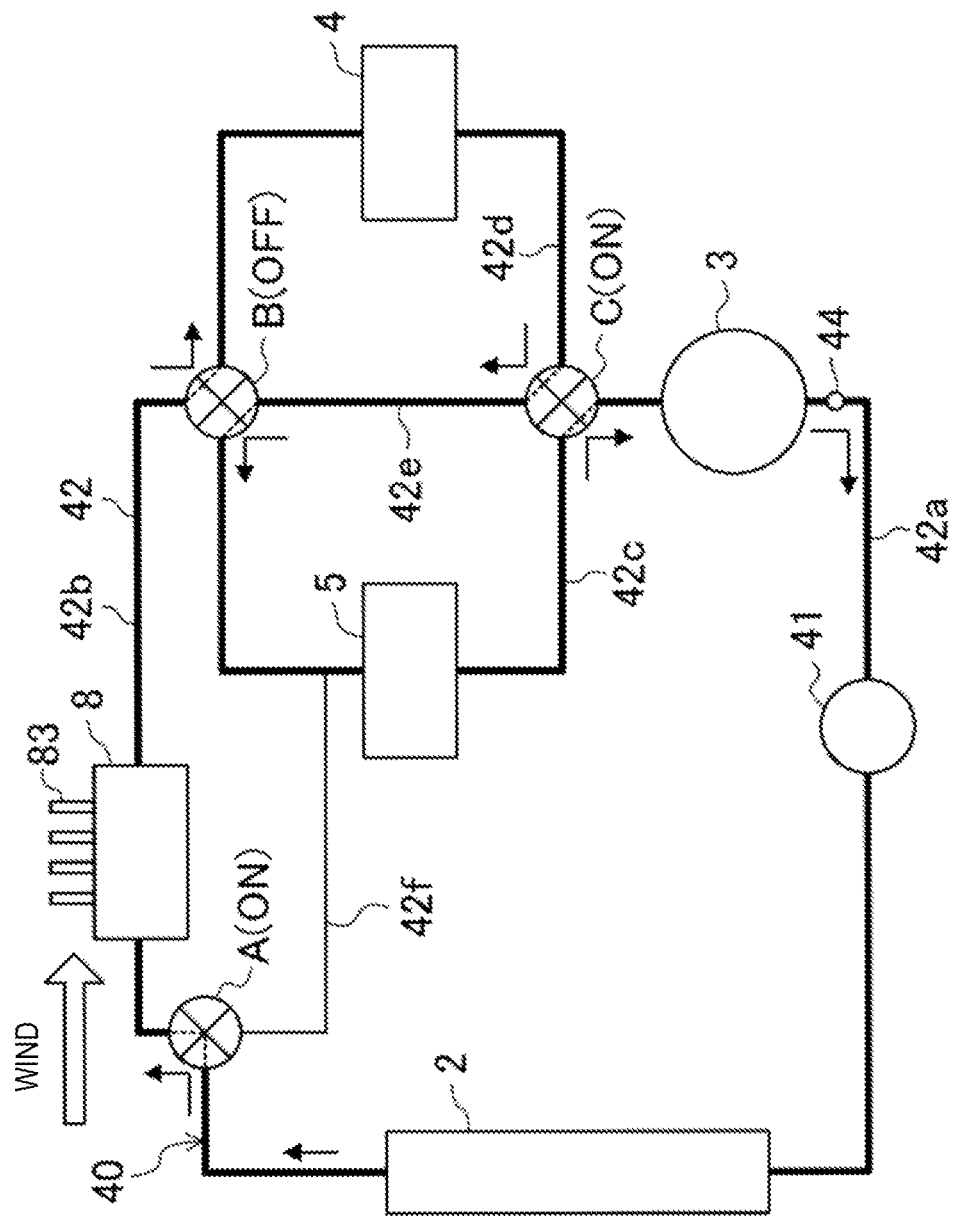
FIG. 11 is a view corresponding to FIG. 5, illustrating a fourth state.

In this case, in this embodiment, as illustrated in FIGS. 7 and 11, the selector valves A and C are set to the ON state, and the selector valve B to the OFF state (the fourth state D4). Therefore, the coolant is sent through the selector valve A to the second route 42b (i.e., to the charger 8). Then, after the coolant is sent to the inverter 4 through the selector valve B, and to the converter 5 through the selector valves C and B, the coolant is sent to the drive motor 3 again through the selector valve C.

Therefore, since the coolant which has further been lowered in the temperature through charger 8 is sent to the inverter 4, the cooling of the inverter 4 can effectively be strengthened.

Thus, by the cooling system 40 according to this embodiment, the load of the electric pump 41 can be reduced by making a detour of the coolant circulation to the charger 8, when the temperatures of the inverter 4 and the converter 5 are below the given temperature, while the charger 8 is not in operation. On the other hand, while the charger 8 is not in operation, when at least one of the temperatures of the inverter 4 and the converter 5 is above the given temperature, the coolant is intentionally sent to the charger 8 so that the charger 8 functions, so to speak, as the second radiator, and the cooling of the inverter 4 or converter 5 can be strengthened. In this way, according to this configuration, both the reduction in the pump load and the improvement in the cooling of the drive unit can be achieved.

Further, in the third state D3 and the fourth state D4, after the coolant is sent to the charger 8, the coolant is first sent to the higher-temperature electric device. In detail, in the third state D3, among the inverter 4 and the converter 5, the coolant is sent to the inverter 4 after the coolant is sent to the converter 5 with a higher temperature. In the fourth state D4, conversely, the coolant is sent to the converter 5 after the coolant is sent to the inverter 4 with a higher temperature. Thus, in the cooling system 40 according to this embodiment, the coolant sending order to the electric devices is changeable according to the temperatures of the inverter 4 and the converter 5. Therefore, the highly-efficient cooling according to the priority of cooling the electric devices is possible.

Note that, normally, the coolant is sent to the electric devices in an ascending order of the calorific value. However, the calorific values of the inverter 4 and the converter 5 increase other than when the vehicle is in the normal traveling state. Further, since the internal structures of the inverter 4 and the converter 5 are similar, it is rare for the temperature difference to become extremely large even if both the temperatures are above the given temperature. Therefore, according to this configuration, the coolant is first sent to the electric device with the higher temperature to effectively cool the electric device of which the cooling needs to be strengthened.

Example of Experiment

In detail, for the conventional cooling system, a result of having verified the temperature of the coolant is described.

Figure 14:
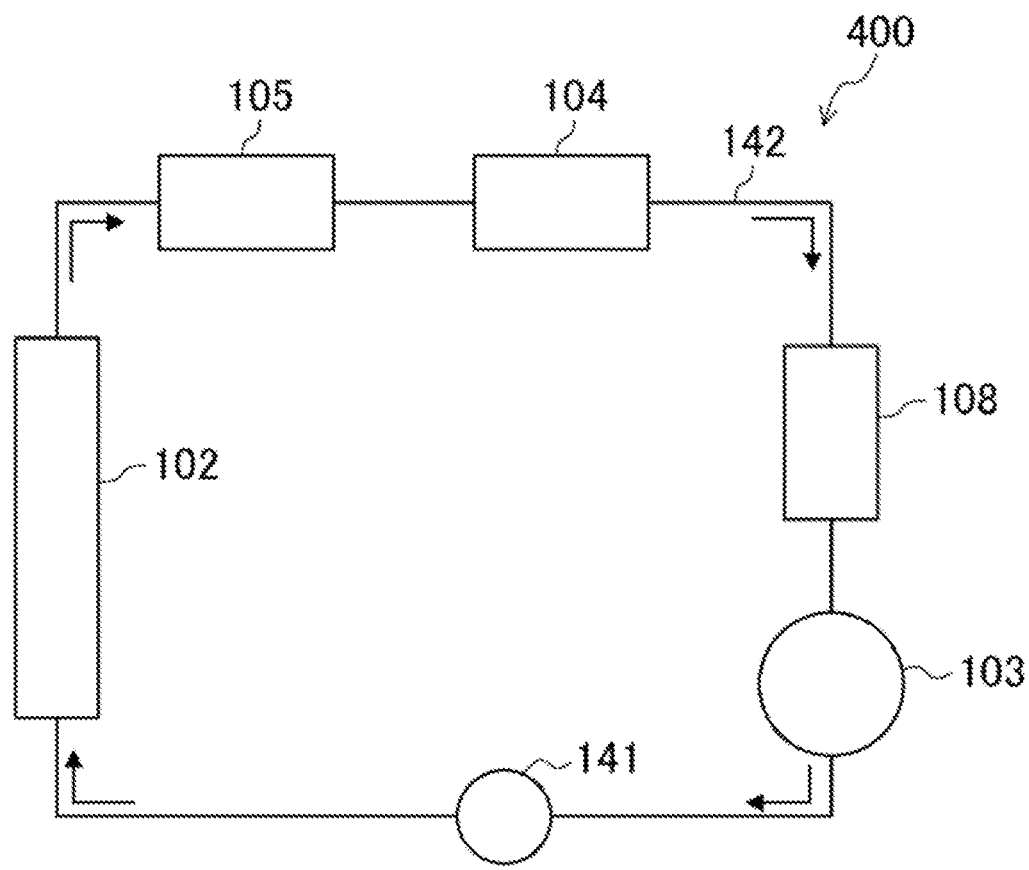
FIG. 14 is an outline block flow diagram of a conventional cooling system.

In a conventional cooling system 400 illustrated in FIG. 14, the coolant sent to a coolant circuit 142 by an electric pump 141 passes through a converter 105, an inverter 104, a charger 108, and a drive motor 103 in this order, after passing through a radiator 102. Note that the layout of each electric device in the vehicle is similar to the layout of FIG. 1.

Figure 12:
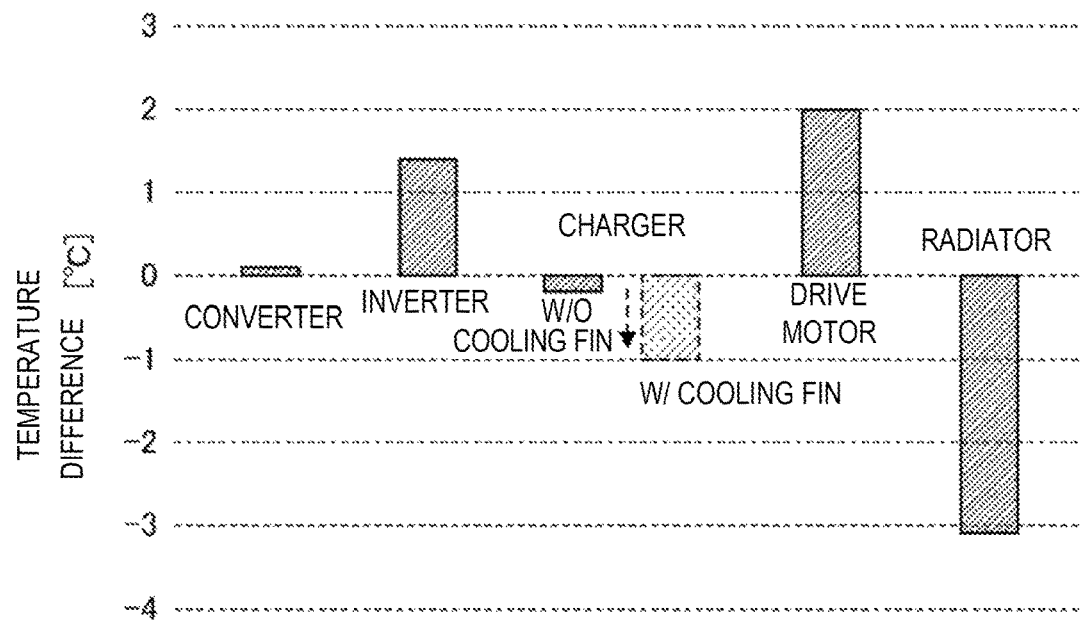
FIG. 12 is a graph illustrating a difference in the temperature of coolant (water) before and after passing through each electric device during a normal travel.

For the cooling system 400, the temperature difference of the coolant (water) before and after passing through each electric device during the normal traveling at 100 km/h is illustrated in FIG. 12. In FIG. 12, data illustrated by solid lines are actual measurements, and data illustrated by a broken line is a calculated value. Note that during the normal traveling, the converter 105, the inverter 104, and the drive motor 103 are in an active state, but the charger 108 is in an inactive state.

As illustrated in FIG. 12, all the temperatures of the coolant which passed through the converter 105, the inverter 104, and the drive motor 103 are increased. Further, the temperature of the coolant which passed through the radiator 102 is decreased. Moreover, it turned out that the temperature of the coolant which passed through the charger 108 (without the cooling fin) is also decreased. That is, from the results, it can be seen that the charger 108 in the non-used state is in a state where it radiates heat as a natural convection so to speak, and is available as the second radiator.

When the heat release amount and the thermal resistance of the charger 108 are calculated based on the results of FIG. 12 in consideration of the ambient temperature, they are about 100 W and about 4.8 K/W, respectively.

When the cooling fin similar to FIG. 2 is provided to the charger 108, it can be predicted that the thermal resistance of the charger 108 decreases to about 2.4 K/W. Then, it can be predicted that the heat release amount of the charger 108 increases to about 550 W.

Figure 13:
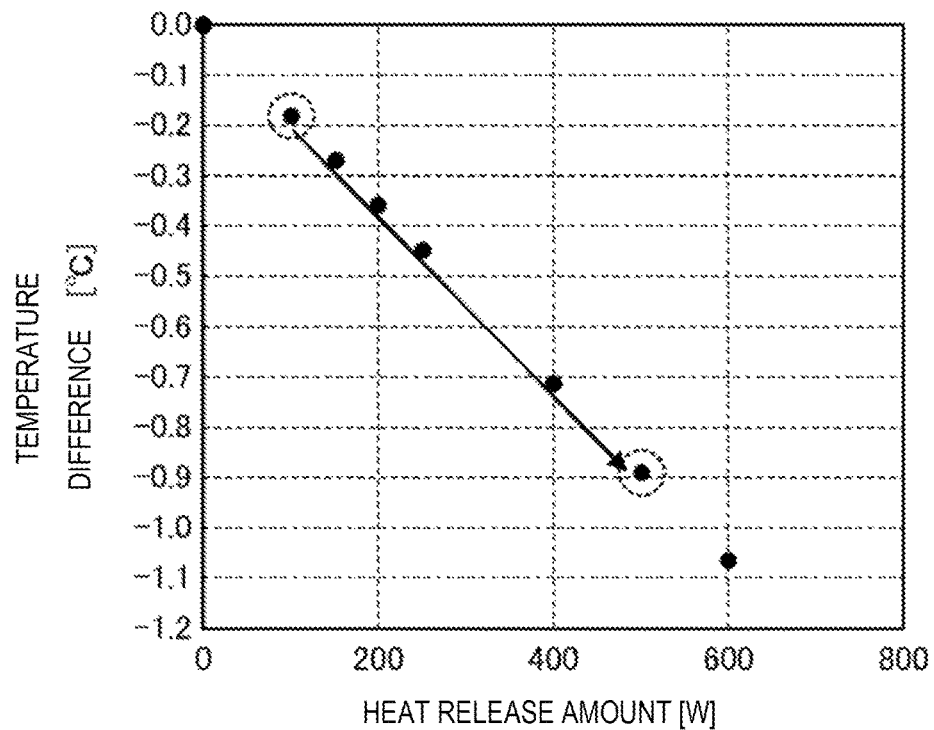
FIG. 13 is a graph illustrating a relationship (calculation result) between an amount of heat release from the charger and a temperature difference of the coolant.

FIG. 13 illustrates a relationship (calculation result) between the heat release amount of the charger 108 and the difference in the coolant temperature. As illustrated in FIG. 13, it is predicted that, when the heat release amount of the charger 108 increases from about 100 W to about 550 W, the temperature of the coolant which passed through the charger 108 drops by about 1° C. This calculation result is illustrated in FIG. 12 by the broken line.

Further, for example, if the cooling fin is disposed so as to project to the outside of the vehicle as illustrated in FIG. 3, it can be predicted that the heat release amount of the charger 108 further increases, and the function of the charger 108 as the second radiator further improves.

Other Embodiments

Below, other embodiments according to the present disclosure will be described. Note that in the explanation of these embodiments, the same parts as the above embodiment are assigned with the same reference characters to omit their detailed explanations.

The installed position of the charger 8 is not limited to the trunk floor 1c, as long as it is rearward of the drive unit 60.

The charger 8 may not be provided with the cooling fin 83. Further, if the charger 8 is provided with the cooling fin 83, the cooling fin 83 may not project to the outside the vehicle.

Note that, from the viewpoint of improving the function of the charger 8 as the second radiator, when the charger 8 is provided with the cooling fin 83, the charger 8 is more desirable to be disposed so that the main body 81 is located inside the vehicle 1 and the cooling fin 83 projects to the outside of the vehicle, regardless of the installed location of the charger 8.

In order to increase the heat release amount of the charger 8, a fan capable of ventilating the charger 8 may be provided.

The coolant sending order of the drive motor 3 and the electric pump 41 may be reversed. That is, the coolant circuit 42 may be configured so that the coolant passes through the drive motor 3 after passing through the electric pump 41.

Although in the above embodiment a temperature sensor is not provided to the drive motor 3, the temperature sensor may be provided, for example, to a casing of the drive motor 3, and may detect a temperature of the casing surface of the drive motor 3 as the temperature of the drive motor 3.

When the vehicle is during the shutdown, and when the high-voltage battery 6 is being charged by the quick charging route, the cooling system 40 may be in the non-used state (FIG. 5).

The vehicle 1 may be a range extender EV, for example. In that case, the vehicle 1 includes a range extender module in which the engine, the generator, and the converter are integrated. The engine is for power generation. The generator generates power by receiving the motive force of the engine. The converter is connected to the generator and the high-voltage battery 6, and it converts alternating current generated by the generator into direct current, and charges the high-voltage battery 6. If the vehicle 1 is the range extender EV, the generator and the converter included in the range extender module may also be disposed in the coolant circuit 42 as the electric devices included in the drive unit 60.

The present disclosure provides the electric vehicle cooling system capable of achieving both the reduction in the pump load and the improvement in the cooling of the drive unit, and it is therefore very useful.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle (Electric Vehicle)
1c Trunk Floor
2 Radiator (Heat Exchanger)
3 Drive Motor (Electric Device)
4 Inverter (Electric Device)
5 Converter (Electric Device, DC-DC Converter)
6 High-voltage Battery
8 Charger
81 Main Body
83 Cooling Fin
10 Control Device
40 Cooling System
41 Electric Pump (Pump)
42 Coolant Circuit
42f Sixth Route (Bypass Route)
45 Converter Temperature Sensor
46 Inverter Temperature Sensor
60 Drive Unit

What is claimed is:

1. A cooling system for an electric vehicle, comprising:
a drive unit disposed in a front part of the vehicle;
a charger disposed rearward of the drive unit;
a coolant circuit connected to the drive unit and the charger and having a bypass route bypassing the charger,
a pump provided in the coolant circuit and configured to send coolant to the coolant circuit;
a heat exchanger provided in the coolant circuit and configured to cool the coolant;
at least one temperature sensor provided to the drive unit and configured to detect a temperature of the drive unit; and
a control device configured to control circulation of the coolant to the coolant circuit based on the temperature of the drive unit detected by the at least one temperature sensor,
wherein the control device is configured to:
send the coolant to the bypass route, when the charger is not in operation, and when the temperature of the drive unit is below a given temperature; and send the coolant to the drive unit after sending the coolant to the charger, when the charger is not in operation, and when the temperature of the drive unit is above the given temperature, wherein the drive unit includes a plurality of electric devices, wherein the at least one temperature sensor is a plurality of temperature sensors, each provided to a respective one of the plurality of electric devices, and wherein the control device is configured to change a sending order of the coolant to the electric devices according to the temperatures of the electric devices.

2. The cooling system of claim 1, wherein the plurality of electric devices includes a DC-DC converter and an inverter, and wherein the control device sends the coolant first to the electric device with a higher temperature between the DC-DC converter and the inverter, when the temperature of at least one of the DC-DC converter and the inverter is above the given temperature.

3. The cooling system of claim 1, wherein the charger includes a main body and a cooling fin provided to the main body.

4. The cooling system of claim 3, wherein the main body is disposed inside the vehicle, and the cooling fin projects to outside of the vehicle.

5. The cooling system of claim 4, wherein the main body is disposed inside a trunk floor of the vehicle, and wherein the cooling fin extends downwardly from the main body, and projects to outside of the trunk floor.

6. The cooling system of claim 5, wherein the control device sends the coolant to the charger, when the charger is in operation.

7. The cooling system of claim 1, wherein the control device sends the coolant to the charger, when the charger is in operation.

8. A cooling system for an electric vehicle, comprising:

a drive unit disposed in a front part of the vehicle;

a charger disposed rearward of the drive unit, the charger including a main body and a cooling fin provided to the main body;

a coolant circuit connected to the drive unit and the charger and having a bypass route bypassing the charger;

a pump provided in the coolant circuit and configured to send coolant to the coolant circuit;

a heat exchanger provided in the coolant circuit and configured to cool the coolant;

at least one temperature sensor provided to the drive unit and configured to detect a temperature of the drive unit; and a control device configured to control circulation of the coolant to the coolant circuit based on the temperature of the drive unit detected by the at least one temperature sensor, wherein the control device is configured to:

send the coolant to the bypass route, when the charger is not in operation, and when the temperature of the drive unit is below a given temperature; and send the coolant to the drive unit after sending the coolant to the charger, when the charger is not in operation, and when the temperature of the drive unit is above the given temperature.

9. The cooling system of claim 8, wherein the main body is disposed inside the vehicle, and the cooling fin projects to outside of the vehicle.

10. The cooling system of claim 9, wherein the main body is disposed inside a trunk floor of the vehicle, and wherein the cooling fin extends downwardly from the main body, and projects to outside of the trunk floor.

11. The cooling system of claim 8, wherein the control device sends the coolant to the charger, when the charger is in operation.

* * * * *